April 1, 1969 F. W. MOUNTS ET AL 3,436,471

MULTICHANNEL TELEVISION TRANSMISSION SYSTEM UTILIZING THE BLANKING INTERVALS OF TRANSMITTED TELEVISION SIGNALS AS TIME SLOTS TO ACCOMMODATE ADDITIONAL TELEVISION SIGNALS

Filed June 1, 1966 Sheet 1 of 4

INVENTORS F. W. MOUNTS
B. PRASADA
BY
John K. Mullarney
ATTORNEY

April 1, 1969 F. W. MOUNTS ET AL 3,436,471

MULTICHANNEL TELEVISION TRANSMISSION SYSTEM UTILIZING THE BLANKING INTERVALS OF TRANSMITTED TELEVISION SIGNALS AS TIME SLOTS TO ACCOMMODATE ADDITIONAL TELEVISION SIGNALS

Filed June 1, 1966 Sheet 2 of 4

MULTICHANNEL TELEVISION TRANSMISSION SYSTEM UTILIZING THE BLANKING INTERVALS OF TRANSMITTED TELEVISION SIGNALS AS TIME SLOTS TO ACCOMMODATE ADDITIONAL TELEVISION SIGNALS

Filed June 1, 1966

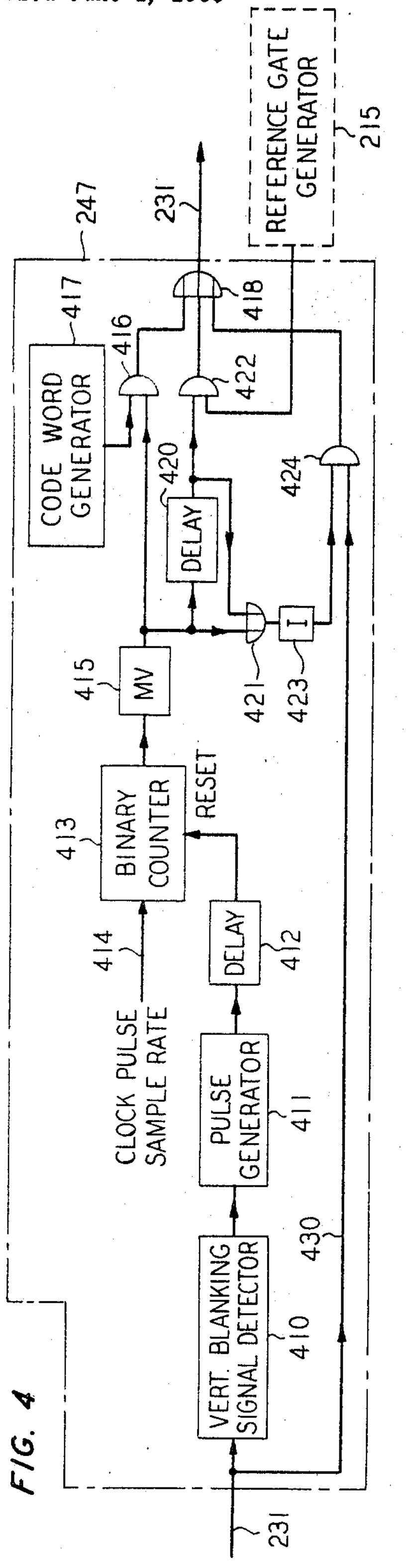
FIG. 5
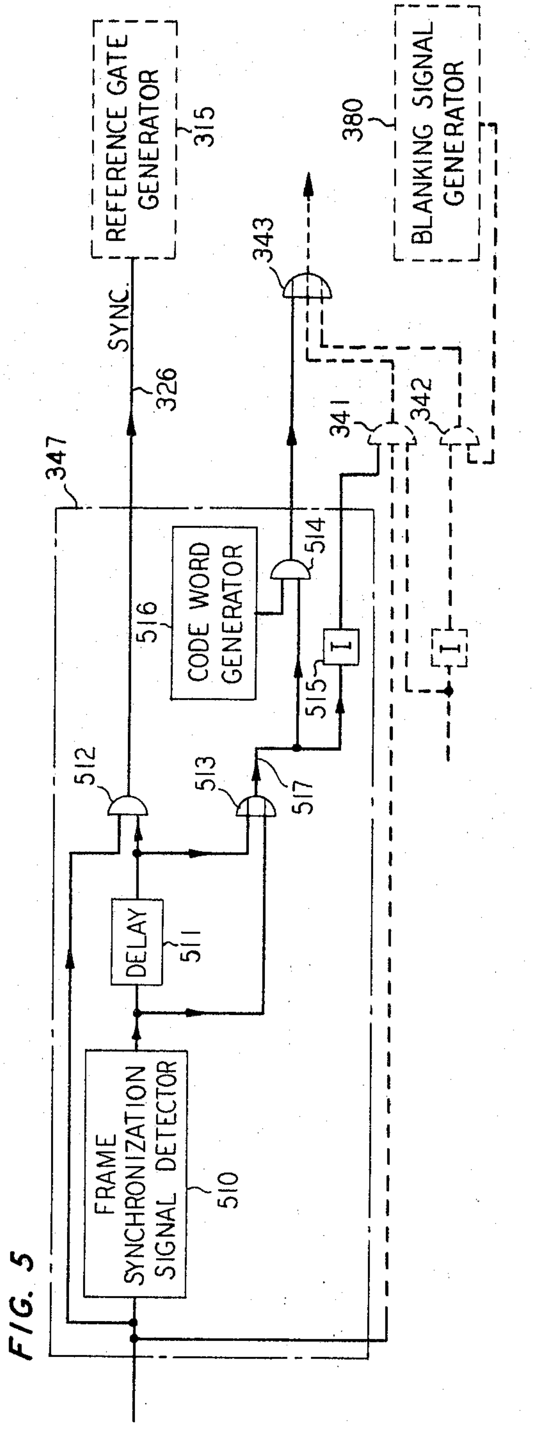

United States Patent Office 3,436,471
Patented Apr. 1, 1969

3,436,471
MULTICHANNEL TELEVISION TRANSMISSION SYSTEM UTILIZING THE BLANKING INTERVALS OF TRANSMITTED TELEVISION SIGNALS AS TIME SLOTS TO ACCOMMODATE ADDITIONAL TELEVISION SIGNALS

Frank W. Mounts, Murray Hill, N.J., and Birendra Prasada, Brighton, Mass., assignors to Bell Telephone Laboratories, Incorporated, Murray Hill, N.J., a corporation of New York Filed June 1, 1966, Ser. No. 554,395
Int. Cl. H04n 7/00, 7/08; H04j 3/02
U.S. Cl. 178—6 6 Claims

ABSTRACT OF THE DISCLOSURE

A television transmission system wherein the horizontal blanking intervals of a plurality of television signals utilizing a like number of transmission channels are arranged in a juxtaposed ordered sequence such that successive portions of an additional television signal may be sequentially applied to each channel during said blanking interval.

This invention relates to television transmission systems and, more particularly, to the application of multiplexing techniques therein to utilize the blanking intervals of conventional transmitted television signals for the transmission of additional television signals.

In the conventional television transmission system a considerable portion of the transmission time is devoted to the transmission of the blanking intervals of the television signal. The horizontal blanking interval, for instance, represents approximately 15 percent of the total horizontal scan time. In the conventional analog television signal the idle period during each horizontal and vertical blanking interval is utilized to transmit horizontal and vertical synchronizing signals superimposed on the blanking signals.

In a digital television transmission system it is not necessary to transmit a synchronizing signal at the end of each horizontal scanning interval. In such transmission systems a synchronizing signal at the beginning of each field interval is sufficient to maintain the necessary synchronism between the transmitter and receiver. The horizontal blanking signals and their related synchronizing signals in a digital transmission system may be discarded in transmission and reconstructed at the receiver. Therefore, in transmitting a conventional television signal over a digital transmission system the idle period during the horizontal blanking interval serves no useful purpose. This idle period may be used to advantage to transmit additional information regarding the picture signal transmitted during the active portion of the signal. One such system is described, for instance, in the copending application of E. F. Brown, Ser. No. 491,528, filed Sept. 30, 1965, and assigned to applicants' assignee.

In closed circuit digital television systems, the conventional equalizing and serrated vertical synchronizing pulses may also be discarded. The horizontal oscillators are sufficiently stable so that these added synchronization pulses are not required. In such systems the synchronizing and blanking pulse structure of the television signal is modified to eliminate the equalizing and serrated vertical synchronizing pulses.

In multichannel closed circuit digital transmission systems the accumulated transmission time of the horizontal blanking intervals of the television signals being transmitted may exceed the total time duration of the picture signal region of one of the individual television signals. Since in digital transmission systems the horizontal blanking and synchronizing signals may be discarded and reconstructed at the receiver, 15 percent of the transmission time of each horizontal scan interval is unused. With a sufficient number of transmission channels, this additional unused time may thus be utilized to transmit the picture signal portion of an additional television signal.

It is therefore an object of the present invention to more efficiently utilize transmission channel capacity in multichannel television transmission systems.

It is another object of the present invention to transmit a number of television signals which exceed the number of channels normally available for their transmission.

It is yet another object of the present invention to more fully utilize the idle periods in a television transmission system due to the blanking intervals of the transmitted television signals.

In accordance with the present invention, a multichannel multiplex television transmission system utilizes the blanking intervals of the television signals assigned to each transmission channel as time slots in which to insert an additional television signal for transmission purposes. The blanking intervals of the television signals assigned to the available transmission channels are arranged sequentially before transmission and are aligned with the picture signal portion of the additional television signal. With a sufficient number of transmission channels available, the television signals thereon can be time arranged such that the total accumulated time of the sequentially arranged blanking intervals is sufficient to accommodate the additional television signal. Switching apparatus at the transmitter applies successive portions of the additional television signal to each transmission channel during the blanking interval of the television signal assigned to that particular channel. Switching equipment at the receiver separates this additional television signal from each channel and reconstructs the original additional television signal.

Available transmission time for the sending of the additional television signal is obtained by discarding the horizontal blanking signals and restricting all synchronizing information to occur during the vertical blanking interval. Consequently, the full time allotment of each horizontal blanking interval is available for the transmission of portions of the additional television signal. By inserting portions of the additional television signal in each horizontal blanking interval the transmission capacity of each channel is thereby more efficiently utilized.

These and other objects and features, the nature of the present invention, and its various advantages may be more readily understood upon consideration of the accompanying drawings and the following detailed description. In the drawings:

FIG. 4 is a schematic block diagram of the multiplexer framing logic used to generate synchronizing signals to be transmitted to the demultiplexer shown in FIG. 3; and FIG. 5 is a schematic block diagram of the demultiplexer framing logic which receives and utilizes the above-mentioned transmitted synchronizing signals.

Figure 1:
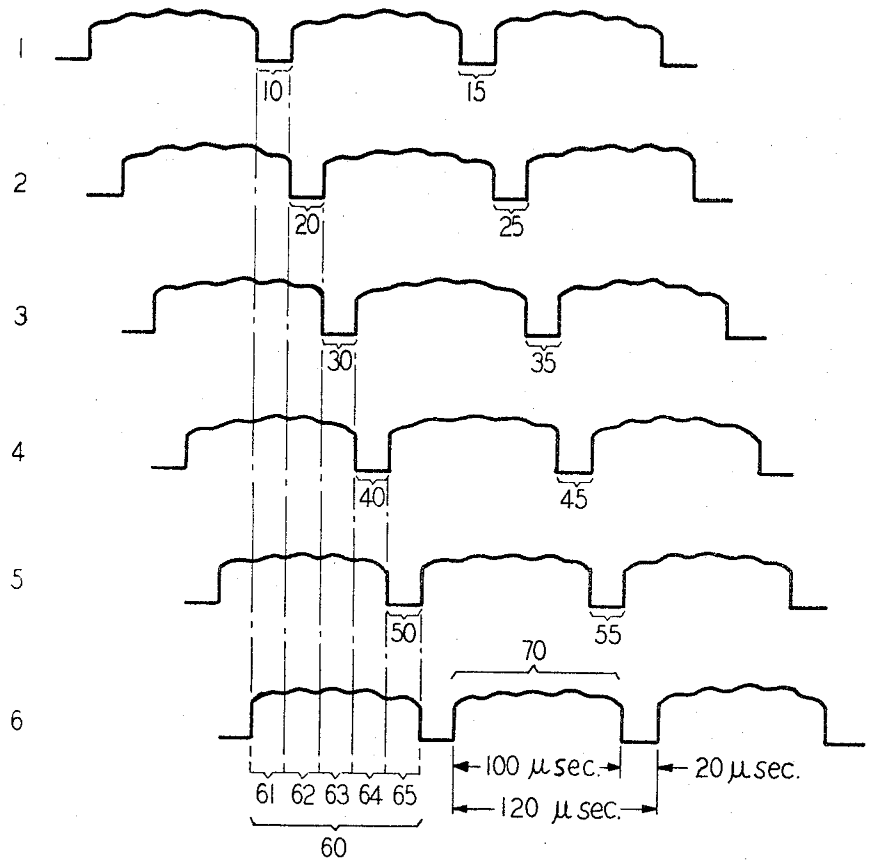
FIG. 1 is an illustrative graphical representation of the time arrangement of six television signals which are to be transmitted over five transmission channels.

Referring more particularly to FIG. 1, the portions of six television signals for three complete scanned lines are graphically illustrated arranged in time in accordance with the present invention. The blanking intervals of the six television signals have all been arranged in a time sequence such that no two blanking intervals overlap or occur simultaneously. The television signals one through five are respectively assigned to five transmission channels; the sixth television signal is multiplexed with the other five by inserting successive portions of its picture signal region 60 into the blanking intervals 10, 20, 30, 40, and 50 of the first five signals.

For illustrative purposes it shall be assumed that the time duration of each complete scanned line of each television signal is 120 microseconds, of which the blanking interval comprises 20 microseconds. It is therefore apparent that the combined accumulated time of the blanking intervals 10, 20, 30, 40, and 50 of the first five television signals is equal in duration (100 microseconds) to the duration of the picture signal region 60 of the sixth television signal.

As shown diagrammatically in FIG. 1, the portion 61 of the picture signal region 60 of the sixth television signal will be inserted in the horizontal blanking interval 10 and transmitted in this multiplexed manner with the first signal. The succeeding portion 62 will be inserted in the horizontal blanking interval 20 and transmitted with the second television signal, and so on. The next successive picture signal region 70 of the sixth television signal will in turn be multiplexed into the blanking intervals 15, 25, 35, 45, and 55 of the first five television signals, and so on. The transmitted portions of the sixth signal are then extracted from the blanking intervals at the receiver and reconstructed into the original sixth television signal. It is to be understood that the above arrangement of television signals is merely illustrative of one manner of arrangement to utilize blanking intervals for signal transmission purposes and is not intended to limit the scope of applicants' invention.

Figure 2:
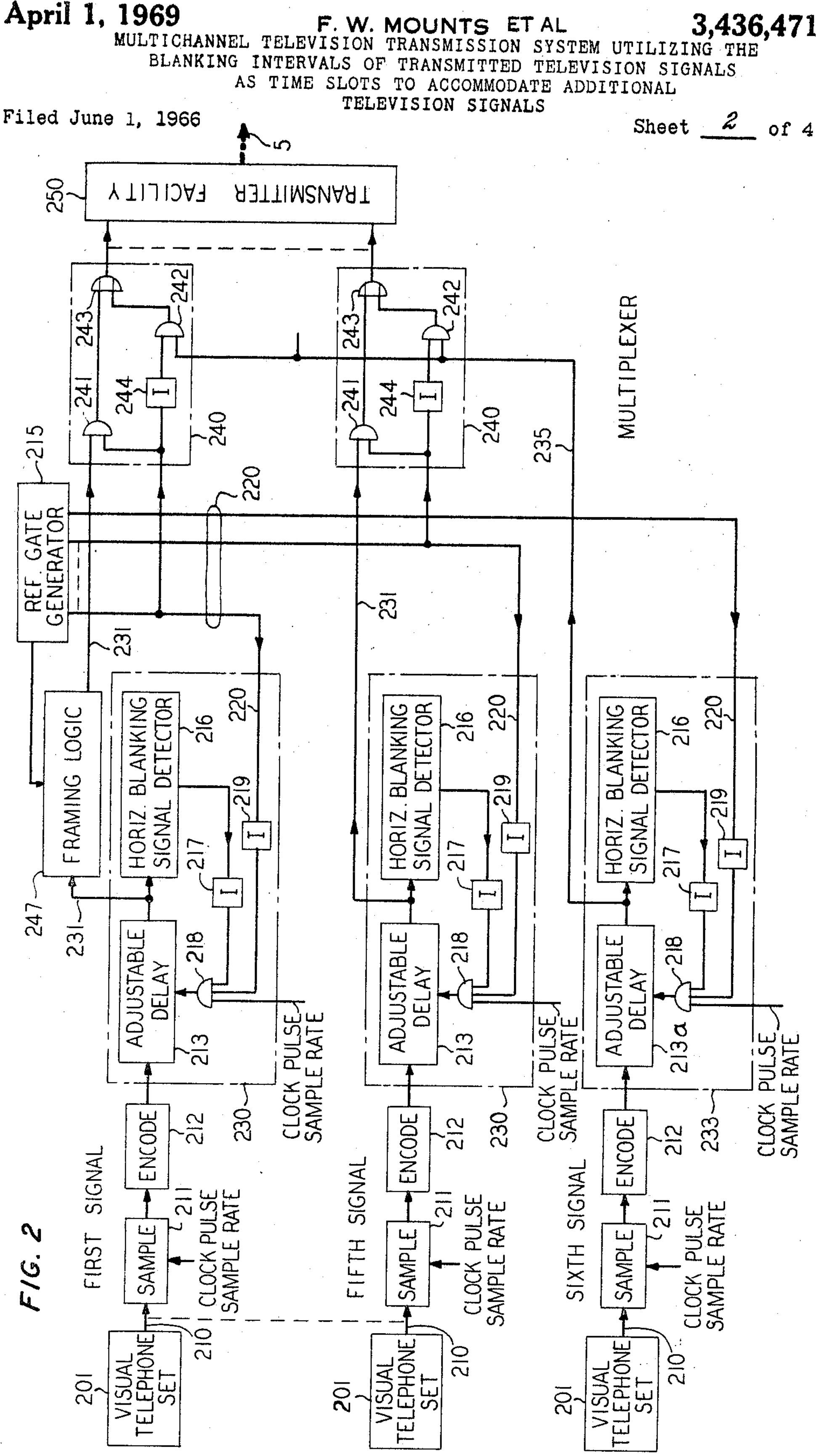
FIG. 2 is a schematic block diagram of a television signal multiplexing apparatus for a multichannel television transmission system in accordance with the present invention.

Referring more particularly to FIG. 2, a detailed schematic block diagram is shown of a television signal multiplexing apparatus to permit the transmission of the six television signals, as shown in FIG. 1, over a five-channel transmission system. It is to be understood that the number of channels and television signals selected is merely for purposes of illustration only and is not to be construed as limiting the scope of the applicants' invention. The switching apparatus to multiplex the six television signals on the five transmission channels is shown in detail only for the first, fifth, and sixth television signals. The switching apparatus to process the second, third, and fourth television signals is identical, for example, to that used to process the fifth television signal and, hence, the same is not shown in the drawing.

The multiplexer, as shown in FIG. 2, comprises six identical input terminals 210, to which the six analog television type signals generated by the independent sources 201 are respectively applied, and a five channel output transmission path 5, upon which the six digitally encoded television signals are transmitted to a remote demultiplexer and receiver. Each independent television source 201 may typically comprise a visual telephone station subset. The six analog television signals are respectively applied to the sample circuits 211. Clock pulses derived from a clock pulse source, not shown, are applied to the sample circuits 211 to enable the periodic sampling of the six analog television signals. These signal samples are applied to the encoders 212 which encode the analog samples of the six television signals in a predetermined digital pulse code. Such encoding techniques are well known in the art and it is not believed necessary to discuss the same in detail.

The first five television signals, now digitally encoded, are applied to their respective signal alignment logic circuits 230. The sixth television signal is applied to the signal alignment logic circuit 233 which is essentially identical to the alignment circuits 230. These six signal alignment logic circuits detect the horizontal blanking intervals in each of the applied television signals and align these respective blanking intervals in phase with six differently phased control signal generated by the reference gate generator 215.

A suitable signal alignment logic circuit 230 may comprise an adjustable delay circuit 213 to which the television signal is applied. The adjustable delay circuit 213 may inturn comprise a shift register with a control feedback loop, or some other equivalent arrangement known in the art. The adjustable delay circuit retards or advances the applied television signal, in relative phase and in a manner to be described hereinbelow, to appropriately time arrange the blanking interval of the signal. The television signal is then subsequently applied to a horizontal blanking signal detector 216, which detects its horizontal blanking interval and in response thereto generates an output signal.

The outputs of the adjustable delay circuits 213, respectively delaying the first five television signals, are applied, via lead 231, to individual signal selection switches 240.

The output of the adjustable delay circuit 213*a*, associated with the sixth television signal, is applied, via lead 235, to each of the five signal selection switches 240. The signal selection switches 240 serve to gate portions of the picture signal of the sixth television signal to a transmission channel during the occurrence of the horizontal blanking interval of the television signal assigned to that particular channel. The operation of the signal selection switch 240 is discussed in detail hereinbelow.

Each horizontal blanking signal detector 216 generates an output signal representative of a binary "1" upon detection of the horizontal blanking interval of the associated television signal. It also generates a signal representative of a binary "0" during the picture signal region of the associated television signal. The signal output of each horizontal blanking detector 216 is applied to an inverter 217 and from thence to an AND gate 218. Other inputs to each AND gate 218 are respectively applied by the clock source, which supplies pulses at the sample rate, and by the reference gate generator 215, which applies a control signal via a respective lead 220 and an inverter 219.

The reference gate generator 215 generates six distinct control signals, one associated with each of the television signals to be transmitted. Each control signal is applied to the one of the alignment circuits 230 and 233 to time arrange the associated television signal. In the illustrative embodiment each control signal is 60 degrees out of phase, or a multiple thereof, with the other control signals. For example, a control signal associated with the second television signal will lag the control signal associated with the first television signal by 60 degrees. More explicitly, the reference gate generator 215 generates a different phased control signal representative of a binary "1" on each of its six output leads 220. Each control signal has a signal duration equal to the picture signal duration of its associated television signal and an idle duration (i.e., binary "0") equal to its blanking interval. A suitable reference gate generator 215 may comprise, for instance, a six stage ring counter which normally has five energized stages, energization of the five stages of the six stage counter occurring in a cyclic repetitive fashion. The count or shifting operation of the ring counter takes place at a rate equal to six times the line frequency of the television signals.

If a control signal of the reference gate generator 215 is in phase with its associated television signal (i.e., if it is in time alignment with the blanking interval thereof), a signal representative of a binary "0" is applied, via lead 220, to the inverter 219 at the same time that a signal representative of a binary "1" is applied to the inverter 217 by the detector 216. It is therefore apparent that when the associated control and television signals are in phase AND gate 218 is disabled, thereby inhibiting the transmission of clock pulses to the control of the adjustable delay circuit 213. Conversely, should the control signal and its associated television signal be out of phase, AND gate 218 is enabled, thereby permitting the application of clock pulses to the control of the adjustable delay 213. The adjustable delay, in response thereto, phase advances (alternatively, the logic can be such as to retard phase) the television signal to bring it into phase with the associated control signal of the reference gate generator. In this manner the first five television signals are time ordered in a fashion such as shown in FIG. 1.

The first five time arranged television signals, as hereinbefore described, are applied, via lead 231, to their respective signal selection switches 240. The sixth television signal is simultaneously applied, via lead 235, to all five signal selection switches 240. Each of the signal selection switches 240 comprises a pair of AND gates 241 and 242, of which their two respective signal outputs are applied to an OR gate 243. The five control signals of the reference gate generator 215, associated with the first five television signals, are applied, respectively, to the appropriate AND gates 241 and 242, as shown in FIG. 2. The control signals applied to the respective AND gates 242 are delivered via inverters 244. These control signals selectively enable the transmission of the picture signals of the first five television signals, and a portion of the picture signal of the sixth television signal during the blanking intervals of each of the first five television signals.

As an illustrative example, the transmission of the first television signal and the first segment of the sixth television signal, via the first signal selection switch 240, will be explained. During the active picture signal region of the first television signal AND gate 241 will be energized by the first phased control signal of the reference gate generator 215. Enabled AND gate 241 thus permits the picture signal region of the first television signal to be transmitted to the transmitter facility 250. The transmitter facility 250 prepares the signal for transmission (e.g., modulates the same on a carrier) and applies it to the first channel of a five channel transmission path 5 for transmission to some remote receiver facility. The five channel transmission path 5 may comprise, for instance, five separate transmission cables or a single broadband cable upon which the transmitter facility multiplexes (in time or frequency) the five incident signals. It is to be understood that the five channel transmission path may comprise any signal transmission apparatus known in the art capable of transmitting digital television signals.

During the blanking interval of the first television signal, the first phase control signal of the reference gate generator 215 is idle or representative of a binary "0." In response to this binary "0" signal AND gate 241 is disabled thereby prohibiting the transmission therethrough of the first television signal. However, through the action of the inverter 244 AND gate 242 is now enabled. During the period AND gate 242 is enable a portion of the sixth television signal, applied via lead 235, is transmitted through the signal selection switch 240 to the transmitter facility 250, which prepares it for transmission on the first channel of the five channel transmisison path 5.

Since the entire horizontal blanking interval of each of the first five television signals is utilized for the transmission of portions of the picture signal of the sixth television signal, no synchronization signals may be sent in any of the horizontal blanking intervals. Synchronization between the multiplexer and the demultiplexer is achieved by sending synchronization signals during the vertical blanking intervals of one of the television signals. These synchronization signals are generated by the framing logic circuit 247 associated with one of the television signals. In the illustrative example it is shown associated with the first television signal.

The framing logic circuit 247 recognizes the vertical blanking signal of the first television signal and during the vertical blanking interval thereof transmits a synchronization signal, representative of the state of the reference gate generator 215, to the reference gate generator 315 of the demultiplexer. A detailed explanation of the operation of the framing logic circuit 247 of the multiplexer will be given in connection with the description of FIG. 4.

It should be readily apparent from the foregoing that six picture signal regions can be transmitted over five transmission channels by selectively gating the picture signals of six television signals through the five signal selection switches 240. More explicitly, this is accomplished, as described hereinabove, by timing each selection switch to gate the picture signal of one television signal and one-fifth of the picture signal of an additional television signal during the blanking interval of the one television signal. Hence, a composite signal is transmitted, over each channel, having the complete picture signal of one television signal and a portion of the picture signal of another television signal.

Figure 3:
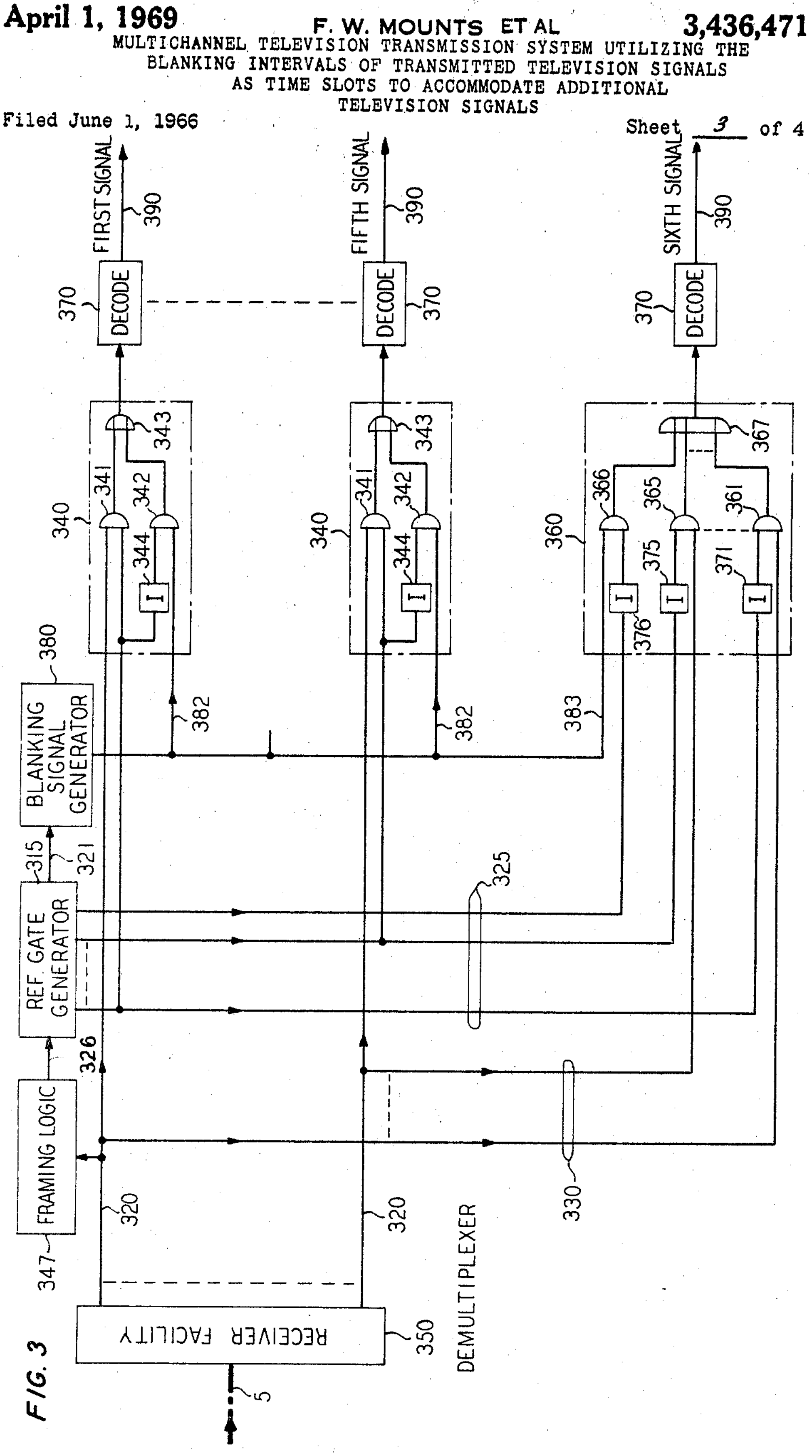
FIG. 3 is a schematic block diagram of a television signal demultiplexing apparatus for a multichannel television transmission system suitable for use with the multiplexing apparatus shown in FIG. 2.

Referring now to FIG. 3, a detailed schematic block diagram is shown of a television signal demultiplexer suitable for use with the multiplexer shown in FIG. 2. The digitally encoded composite television signals transmitted, via the five channel transmission path 5, are applied to a receiver facility 350 at the demultiplexer. The receiver facility 350 applies the television signals to the demultiplexing apparatus which separates the portions of the sixth television signal from each of the five transmitted composite signals. The demultiplexer additionally include apparatus to recreate the blanking intervals and to insert the same in each of the six television signals at the proper time.

The composite signals on the five channel transmission path 5 are applied respectively, via leads 320, to five signal selection switches 340, which are identical to the signal selection switches 240 at the multiplexer. Each of the five signals is additionally applied, via leads 330, to a signal reconstruction circuit 360 which gates to a common lead the various portions of each of the five composite signals which correspond to the picture signal portions of the sixth television signal. The AND gates of the signal selection switches 340 and the signal reconstruction circuit 360 are controlled by control signals generated by the reference gate generator 315. The reference gate generator 315 is synchronized with the reference gate generator 215 of the multiplexer by means of the synchronization signals transmitted over the first channel during the aforementioned vertical blanking intervals. The synchronization signals are applied through the framing logic circuit 347 to the reference gate generator 315 in a fashion to be explained in connection with FIG. 5.

The reference gate generator 315 generates six differently phased control signals in a fashion identical to the reference gate generator 215 of the multiplexer. These control signals are applied, respectively, over six separate output leads 325 and via inverters 371 through 376 to the AND gates 361 through 366 of the signal reconstruction circuit 360. The first five phases of these control signals are additionally applied to the respective AND gates 341 and 342 of the signal selection switches 340. The reference gate generator 315 supplies an additional signal generated at a repetition rate corresponding to six times the line frequency, and it is applied, via lead 321, to a blanking signal generator 380. The blanking signal generator 380, in response to these signals, generates the horizontal blanking interval signals for each one of the received television signals. This additional signal of the reference gate generator 315 may be readily derived from one of the six control signals.

The reference gate generator 315 applies a control signal, representative of a binary "1," to a particular signal selection switch 340 during the picture signal region of the associated composite television signal. Each control signal enables an AND gate 341, permitting the transmission of the picture signal, via OR gate 343, to a decoder circuit 370. The decoder circuit 370 then converts the digitally encoded signal into its analog counter part. This analog television signal is transmitted, via output lead 390, to its intended receiver.

During the subsequent blanking interval following each picture signal region transmitted by a signal selection switch 340 the reference gate generator 315 applies to the selection switch the idle portion of the control signal, representative of a binary "0." This binary "0" signal disables the AND gate 341, hence inhibiting the transmission of the blanking interval portion of the composite television signal. The control signal is inverted, however, by the inverter 344 and thereby enables AND gate 342. The enabled AND gate 342 thus permits a digital horizontal blanking signal derived from the blanking signal generator 380 to be transmitted to the appropriate decoder 370 and hence to the appropriate output lead 390.

Each of the five channels of the transmission path 5 are connected, respectively, via leads 330, to the five AND gates 361 through 365 of the signal reconstruction circuit 360. The first five phased control signals of the reference gate generator 315 are also respectively applied to the five AND gates 361 through 365, via the inverters 371 through 375. These AND gates, in response to the idle portions (i.e., binary "0") of the control signals, are sequentially enabled, thereby accomplishing the reconstruction of the picture signals of the sixth television signal.

The signal reconstruction may be understood by considering the process by which a portion of the sixth signal is separated from the first composite signal. During the blanking interval of the first television signal the output of the reference gate generator 315, which is applied to the inverter 371, will be a binary "0." This will be inverted by the inverter 371 to represent an energizing binary "1." The AND gate 361, in response to this enabling signal, thus permits the portion of the composite signal representing a part of the sixth television signal to be transmitted, via OR gate, 367, to the decoder 370. The AND gates 362 through 366 are disabled at this time and hence transmit no signals. Those skilled in the art should readily understand from the above the similar process by which respective signal portions of the sixth television signal in the second, third, fourth, and fifth transmission channels will similarly be transmitted to the sixth output lead 390.

The idle portion (i.e., binary "0") of the sixth control signal of the reference gate generator 315, corresponding to the blanking interval of the sixth television signal, enables the AND gate 366 and thereby permits the digital horizontal blanking signal generated by the blanking signal generator 380 to be transmitted to the sixth output lead. This digital horizontal blanking signal is similarly converted to its analog form by the decoder 370 for transmission, via output lead 390, to its intended receiver.

In order for the demultiplexer to properly separate the sixth television signal from the five transmitted composite signals, the reference gate generators at the multiplexer and demultiplexer must be synchronized. Synchronization is accomplished as herebefore mentioned by using the vertical blanking interval of any given one of the transmitted televison signals to transmit a synchronization signal. This synchronization is of course a relative one and takes into account the transmission time between the transmitter and receiver facilities.

Referring now to FIG. 4, a detailed schematic block diagram is shown of the framing logic circuit 247 used in the multiplexer of FIG. 2. A vertical blanking signal detector 410, in response to the digital vertical blanking signal of the first television signal from adjustable delay 213, generates a signal representative of a binary "1" which activates the pulse generator 411. The signal pulse output of the pulse generator 411 which has a duration slightly less than a sampling period is applied to a delay circuit 412 which delays the pulse for a sufficient time period so that the pulse output of the delay circuit 412 does not occur during one of the horizontal blanking interval time periods of the first television signal. In the illustrative embodiment this will correspond to a time period equaling two horizontal blanking intervals. This pulse output of delay circuit 412 is not permitted to occur during the horizontal blanking interval because this time slot is normally reserved for the transmission of the sixth television signal.

The delayed pulse output of delay circuit 412 is utilized to reset a binary counter 413. The binary counter 413 in response to clock pulses applied at the sample rate, via lead 414, generates output pulses at a rate equivalent to the field repetition rate of the first television signal. It is apparent from the foregoing that the binary counter 413 during each vertical blanking interval of the first television signal initiates the generation of a synchronization signal by generating an output pulse. The binary counter 413 is kept in synchronism with the recurrence of the vertical blanking intervals by means of the above-described process of resetting the counter. It is to be understood that counter 413 will continue to generate output pulses at the field repetition rate even in the absence of the first television signal.

The pulse output of the binary counter 413 occurring at the end of each field of the television signal is applied to a multivibrator circuit 415. The multivibrator 415, in response thereto, applies a pulse signal of one sample duration to the AND gate 416. AND gate 416, in response thereto, permits the transmission of a digital code word, generated by code word generator 417, to the OR gate 418 and from thence to the signal selection switch 240 as shown in FIG. 2. This unique digital code word, representing an alerting signal and used for this purpose only, informs the framing logic of the demultiplexer that a subsequent code word representing synchronizing information will be transmitted to synchronize the reference gate generators 315 with the reference gate generator 215.

The output of the multivibrator 415 is additionally applied to the delay circuit 420 and to the OR gate 421. Delay circuit 420 delays this signal for one sampling period and applies it to the AND gate 422. This signal enables the AND gate 422 to transmit a digital encoded synchronizing signal generated by the reference gate generator 215, via the OR gate 418, to the signal selection switch 240. This synchronizing signal is a digital signal representative of the binary state of the reference gate generator 215. This synchronizing signal is transmitted to the demultiplexer and utilized to reset the reference gate generator 315.

The OR gate 421 applies the pulse output of multivibrator 415 to the inverter circuit 423 which inverts the signal to one representative of a binary "0." This signal disables the AND gate 424 and hence disables the transmission of one sample of the first television signal, applied via lead 430, to the signal selection switch 240. Similarly, the output of the delay circuit 420 is also applied to OR gate 421 one sample period later and again being inverted disables AND gate 424. Hence, the transmission of two successive samples of the first television signal, via AND gate 424, to the signal selection switch 240, is disabled during the transmission of the alerting and synchronizing signals.

Referring to FIG. 5, a detailed schematic block diagram of the framing logic circuit 347 is shown. The framing logic circuit 347 detects the transmitted alerting and synchronization signals and utilizes these signals to synchronize the reference gate generator 315 with the reference gate generator 215. The frame synchronization signal detector 510 detects the first alerting signal generated by the framing logic 247, and in response thereto, generates a pulse signal having a one sample period duration. This pulse signal is applied to a delay circuit 511 which delays it for one sampling period. This delayed pulse signal is applied to the AND gate 512 to enable the transmission of the subsequent synchronization signal to the reference gate generator 315.

The output pulse signals of both the frame synchronization signal detector 510 and the delay circuit 511 are applied to the OR gate 513. Therefore, for two successive sampling periods during the reception of the alerting and synchronization signals, OR gate 513 transmits a pulse signal representative of a binary "1" to the AND gate 514 and the inverter circuit 515. This signal enables the AND gate 514 to transmit the signal output of the code word generator 516 to the OR gate 343, which is identical to the OR gate 343 shown in FIG. 3. The signal output of code word generator 516 is a digital code which is the digital representation of the conventional vertical blanking signal. This thus replaces the portion of the vertical blanking signal which was originally discarded by the framing logic at the multiplexer in order to transmit the alerting and synchronizing signals. The inverter 515 inverts the aforementioned pulse signal to a signal represeneative of a binary "0." This signal is applied to the AND gate 341, which is the same AND gate 341 as shown in FIG. 3. AND gate 341 is therefore disabled for two continuous sampling periods and hence blocks the data transmitted on the first transmission channel path during the period that synchronization information is being transmitted.

It is apparent to those skilled in the art that the framing logic circuit 247 during each vertical blanking interval removes the original vertical blanking signal from the television signal and inserts in its stead synchronizing information. This synchronizing information is transmitted to the framing logic circuit 347 to synchronize the reference gate generators 315 with the reference gate generator 215.

It can be seen from the foregoing that the multiplexer in FIG. 2 and the demultiplixer in FIG. 3 cooperate to process six separate television signals so as to utilize their blanking intervals and permit the picture signal portions of the six signals to be transmitted in their entirety over five transmission channels.

Many other arrangements, within the scope of applicants' invention, may be substituted for the above embodiment. For example, the blanking intervals may all be arranged to occur simultaneously. The additional signal is inserted into the blanking intervals by a serial to parallel buffer arrangement. The additional signal is subsequently extracted by a parallel to serial buffer arrangement. Another variation is to insert the additional television signal plus suitable coded information into semirandomly arranged blanking intervals. These are but a few of the many varied arrangements which fall within the scope of applicants' invention.

It is to be understood that the above-described arrangements are merely illustrative of the numerous and varied other arrangements which may constitute applications of the principles of the invention. Such other arrangements may readily be devised by those skilled in the art without departing from the spirit and scope of this invention.

What is claimed is:

1. A television transmission system comprising a plurality of transmission channels, a source of television signals for each of said channels, a source of an additional television signal to be transmitted over said channels in common, said additional television signal having a picture signal time duration equal to or less than the cumulative time duration of the horizontal blanking intervals of the plurality of television signals, means to arrange the respective blanking intervals of the plurality of television signals to occur in a juxtaposed ordered sequence, means to apply successive portions of said additional television signal to each transmission channel during the blanking interval of the television signal assigned to that particular channel, receiving means to separate the portions of said additional television signal from each of said plurality of transmission channels and including means to reconstruct said additional television signal from said separated portions of said additional television signal.

2. A television transmission system according to claim 1 wherein the arranging means comprises, means to detect the horizontal blanking intervals of said television signals and said additional television signal, reference gate generator means to generate a control signal for each of said television signals and said additional television signal, the control signals being arranged in a successive time order sequence such that each successive one of said control signals is time displaced for a period equal to a blanking interval for the preceding control signal, and means to selectively delay said television signals and said additional television signal in response to a comparison of coincidence between said horizontal blanking intervals and said control signals.

3. A television transmission system according to claim 2 wherein the means to apply successive portions of said additional television signal comprises a plurality of signal selection switches responsive to said control signals, said signal selection switches each including a first gating means to enable the transmission of said television signals and a second gating means to enable the transmission of a selected portion of said additional television signal, said first and second gating means being enabled successively in response to said control signals.

4. A television transmission system according to claim 2 wherein said receiving means to separate and reconstruct said additional television signal includes a source of control signals synchronized with the control signals generated by said reference gate generator.

5. A television transmission system according to claim 2 including means to synchronize said source of control signals with said reference gate generator, said synchronizing means comprising means to detect a vertical blanking interval of one of said television signals, means to generate a synchronizing signal in response to the detection of said vertical blanking interval, means to transmit said synchronizing signals during said vertical blanking interval, and means to regenerate vertical blanking signals lost during the transmission of said synchronizing signals.

6. A method of transmitting television signals comprising the steps of assigning a predetermined number of television signals to be transmitted over an equal number of transmission channels, selecting said predetermined number to obtain a sufficient time accumulation from the aggregate time of the respective horizontal blanking intervals of said assigned television signals to accommodate an additional television signal to be transmitted, arranging said additional and said assigned television signals such that their respective blanking intervals occur in a juxtaposed time ordered sequence, forming composite signals by inserting successive portions of said additional television signal into successive ones of said time ordered blanking intervals, transmitting the composite signals over said transmission channels, recovering said transmitted composite signals, extracting the portions of said additional television signal from said transmitted composite signals, and reconstructing said additional television signal from said extracted portions of said transmitted composite signals.

References Cited

UNITED STATES PATENTS

| | | | |
|---|---|---|---|
| 2,477,679 | 8/1949 | Young | 178—5.6 |
| 2,527,967 | 10/1950 | Schrader. | |

ROBERT L. GRIFFIN, *Primary Examiner.*

JOSEPH A. ORSINO, Jr., *Assistant Examiner.*

U.S. Cl. X.R.

178—5.6; 179—15